July 16, 1968 L. F. BRIGGS 3,392,685
FILLER HEAD FOR FOOD PRODUCTS
Filed Dec. 13, 1965
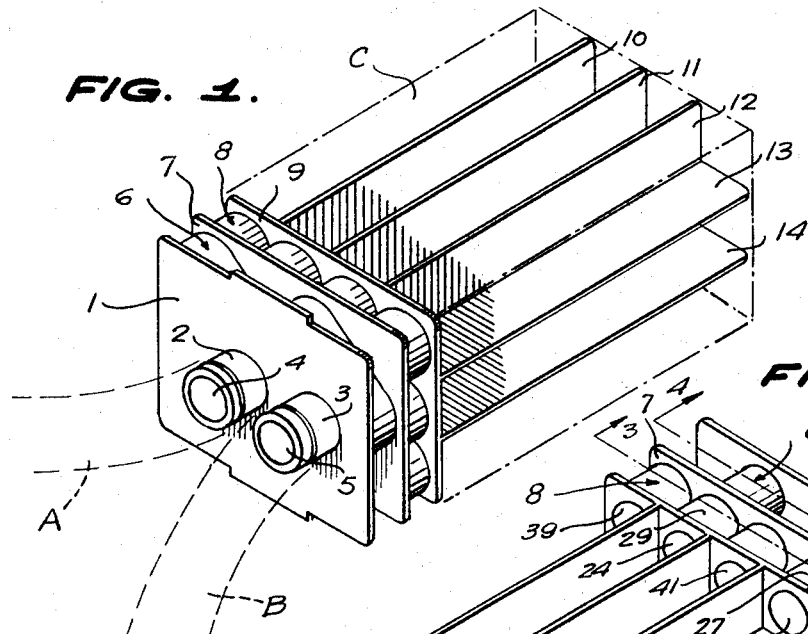
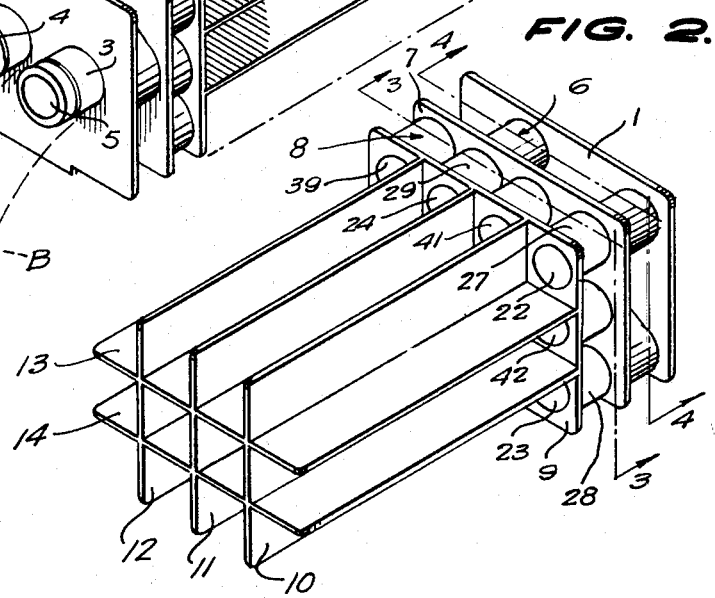
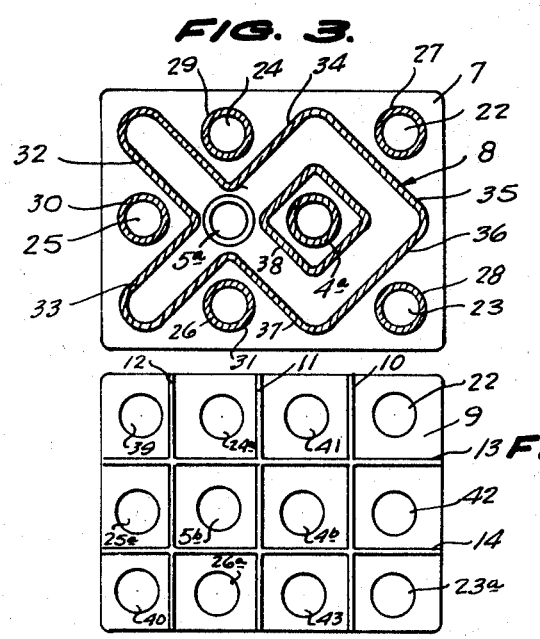
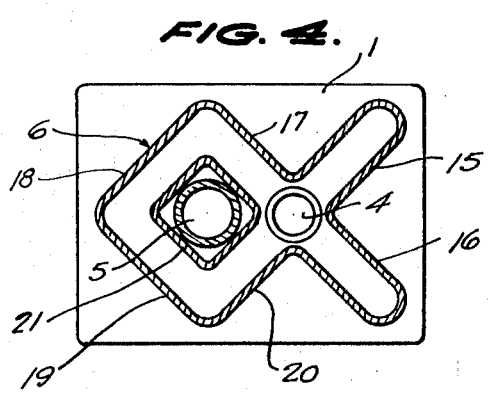
INVENTOR.
LESTER F. BRIGGS,
BY
*Linton + Linton*
ATTORNEYS.

3,392,685
FILLER HEAD FOR FOOD PRODUCTS
Lester F. Briggs, 3621 Benning Road NE.,
Washington, D.C. 20019
Filed Dec. 13, 1965, Ser. No. 513,414
1 Claim. (Cl. 107—1)

ABSTRACT OF THE DISCLOSURE

A filler head for the distribution of food products to a container in such a manner that the resulting product will have a checked appearance.

Description

The principal object of the present invention is to provide a filler head for distributing food products which may consist of different foods or food product mixes or different food products of different colors or may be the same food product but of different colors and which filler head distributes said food products into a container in such a manner that the resultant products will have a checked cross-sectional pattern whereupon the products when sliced laterally will be slices with a checkerboard appearance.

A further and important object of the invention is to provide a rugged long-lasting filler head which can be economically and quickly produced to render the same suitable for mass production and be economically feasible and yet will produce a resulting product having a plurality of differently appearing squares.

Further objects of the invention will be in part obvious and in part pointed out in the following description of the accompanying drawing in which:

FIG. 1 is a perspective view of the filler head as seen from the fill end thereof with a container indicated in dotted lines in position thereon.

FIG. 2 is a perspective view as seen from the distribution end of the filler head.

FIG. 3 is a cross-sectional view taken on line 3—3 of FIG. 2.

FIG. 4 is a cross-sectional view taken on line 4—4 of FIG. 2.

And FIG. 5 is an end view taken from the left of FIG. 2.

Referring now more particularly to the accompanying drawings wherein like and corresponding parts are indicated by the same reference characters numeral 1 indicates a plate having a pair of connector nozzles 2 and 3 fixedly connected thereto as by welding and capable of having hoses A and B respectively attached thereto and which hoses are to be connected to separate conventional filler apparatus (not shown) for feeding food products under pressure through said hoses. Hose A is connected to a filler which supplies a food mix or mixes or a food product of a given color therethrough while hose B is connected to a second filler for supplying a food mix or mixes or food products of a second color which differs in appearance or color to the food products distributed by hose A. For example, hose A can supply an ice cream mix of one color, such as vanilla, while hose B passes an ice cream mix of a second color, such as chocolate. Also hose A, for example, could convey a sausage mix having a colored ingredient, while hose B could supply the same or different sausage mix, but with different colored ingredients. The aforementioned food products are given solely by way of example as a considerable number of different food products of different colors can equally as well be supplied through hose A and B.

Nozzle 2 has a bore 4 which extends through plate 1 and likewise nozzle 3 has a bore 5 which extends through said plate 1.

An endless wall generally indicated at 6 is fixedly connected to plate 1 as by welding and extends laterally thereof to a second plate 7 to which it is fixedly connected also by welding. A further endless wall generally indicated at 8 is fixedly connected, as by welding, to and extends laterally between plate 7 and plate 9.

A plurality of rectangular plates 10 to 14 inclusive are fixedly connected to plate 9 as by welding and extends laterally thereof with plates 10, 11 and 12 being equally spaced apart along the width of plate 9, but extending for the height of the same. Plates 13 and 14 are equally spaced apart along the height of plate 9 but across the width of the same and thus normal to plates 10–12 to which they are fixedly connected as by welding.

Wall 6 includes a U-shaped portion 15 and a second U-shaped portion 16 extending normal to said first U-shaped portion. It also has straight walls 17–20 forming a partial square with U-shaped portions 15 and 16 integral therewith. A second endless tubular wall 21 of a square configuration is positioned within and spaced from walls 17–20 inclusive and extends laterally of and is fixedly connected to plates 1 and 7 as by welding. Bore 5 of tube 3 opens into wall 21 while bore 4 of tube 2 opens within the first mentioned endless wall 6.

Plate 7, as best shown in FIG. 3, has openings 22, to 26, inclusive, which open within endless wall 6.

A plurality of tubes 27 to 31, inclusive, are fixedly connected to plate 7 as by welding and have openings 22 to 26, inclusive, of said plate 7, respectively, openings therein, whereas said tubes extend laterally of plate 7 to plate 9 and have corresponding openings 22a to 26a, inclusive, in plate 9 respectively therein. Said tubes are also fixedly connected to plate 9 as by welding.

A third endless wall 8 has a U-shaped portion 32 with a second U-shaped portion 33 extending normal thereto and a partially squared portion provided by straight walls 34–37 inclusive. A fourth endless tubular wall 38 is positioned within and equally spaced from said walls 34 to 37 inclusive and extends laterally between and is fixedly connected to plates 7 and 9 as by welding. Bore 4 of nozzle 2 corresponds to opening 4a in plate 7 and opens within endless wall 38 while bore 5 of nozzle 3 corresponds to opening 5a of plate 7 which opens within endless wall 8.

Plate 9 also has openings 39 to 43 inclusive which open within wall 8 and alternate with openings 22a to 26a, inclusive, in said plate 9 and which openings with openings 4b and 5b provide straight series of openings extending across the width and height of plate 9. Plates 10 to 14 are connected in plate 9 between said series of openings.

In the use of the present filler head nozzles 2 and 3 are connected to means for supplying food products through tube A and B as previously described and a container C as indicated in FIG. 1, which container may be a metal opened-top box or a conventional paper box, with the lids thereof open such as, for example, conventional ice cream boxes, has plates 9–13 inserted therein whereupon the food products from tube A pass through bore 4 to openings 22–26 inclusive of plate 7 by feeding between endless wall 6 and from said plate 7 openings through tubes 27–31 inclusive and from opening 4a within endless wall 38 to corresponding openings 22a to 26a inclusive and 4b in plate 9 outwardly between the portions of plates 10–13 facing said corresponding openings in plate 9. The food products from hose B pass through bore 5 of nozzle 3 between endless wall 21 and through opening 5a of plate 7 to openings 39–43, inclusive and 5b of plate 9 and from there outwardly between the facing portions of plates 10-13. Container C confines the distributed food product until said container is filled with the result that the food products from tube A forms blocks each of a square configuration and which alternate with the blocks formed by the food products from hose B which are likewise of a square configuration.

When container C is filled with the food products it is slid from plates 10-14 carrying the food products therewith and where necessary subjected to further treatment for solidifying the food products as in the case of ice cream or said solidifying step can be carried out while the plates 10-14 are still in the container. When the food products are ready to be used it can be withdrawn from container C and sliced laterally with the result that each slice will have a checkered appearance due to the difference in the food products from hoses A and B.

The present invention is capable of considerable modification and such changes thereto as come within the scope of the appended claim are deemed to be a part of the present invention.

I claim:
1. A filler head for distributing food products to a container for producing a check pattern in a final food product comprising a plate having a plurality of spaced apart openings positioned in straight series across the height, and width of said plate, a plurality of plates fixedly connected to said first mentioned plate between said openings and extending across the height and width of and laterally from said plate, a second plate having openings positioned in accordance with said alternate ones of said plate openings, tubes fixedly connected to and extending between said plates placing said second plate openings in communication with said alternate ones of said first plate openings, a third plate having a pair of openings for connection to sources of food products under pressure, a wall fixedly connected to and extending between said second and third plates placing one of said third plate openings in communication with said second plate openings, said second plate having a further opening, a second wall fixedly connected to and extending between said second and third plates placing the other of said third plate pair of openings in communication with said second plate further opening and a third wall fixedly connected to and extending between said first and second plates placing said second plate further opening in communication with said remainder of said first plate openings.

References Cited
UNITED STATES PATENTS

| | | | |
|---|---|---|---|
| 2,650,551 | 9/1953 | Eckels et al. | 107—1 |
| 3,213,808 | 10/1965 | Schafer | 107—1 |
| 3,217,734 | 11/1965 | Fitzgerald. | |
| 3,295,466 | 1/1967 | Bell et al. | 107—1 |
| 3,295,467 | 1/1967 | Gropen | 107—1 |
| 3,324,905 | 6/1967 | Paulo | 107—1 |

WALTER A. SCHEEL, *Primary Examiner.*

A. O. HENDERSON, *Assistant Examiner.*